June 24, 1969 G. LESTON 3,452,104
PROCESS FOR SEPARATION OF MONO-BUTYLATED CRESOLS
Filed Dec. 3, 1965
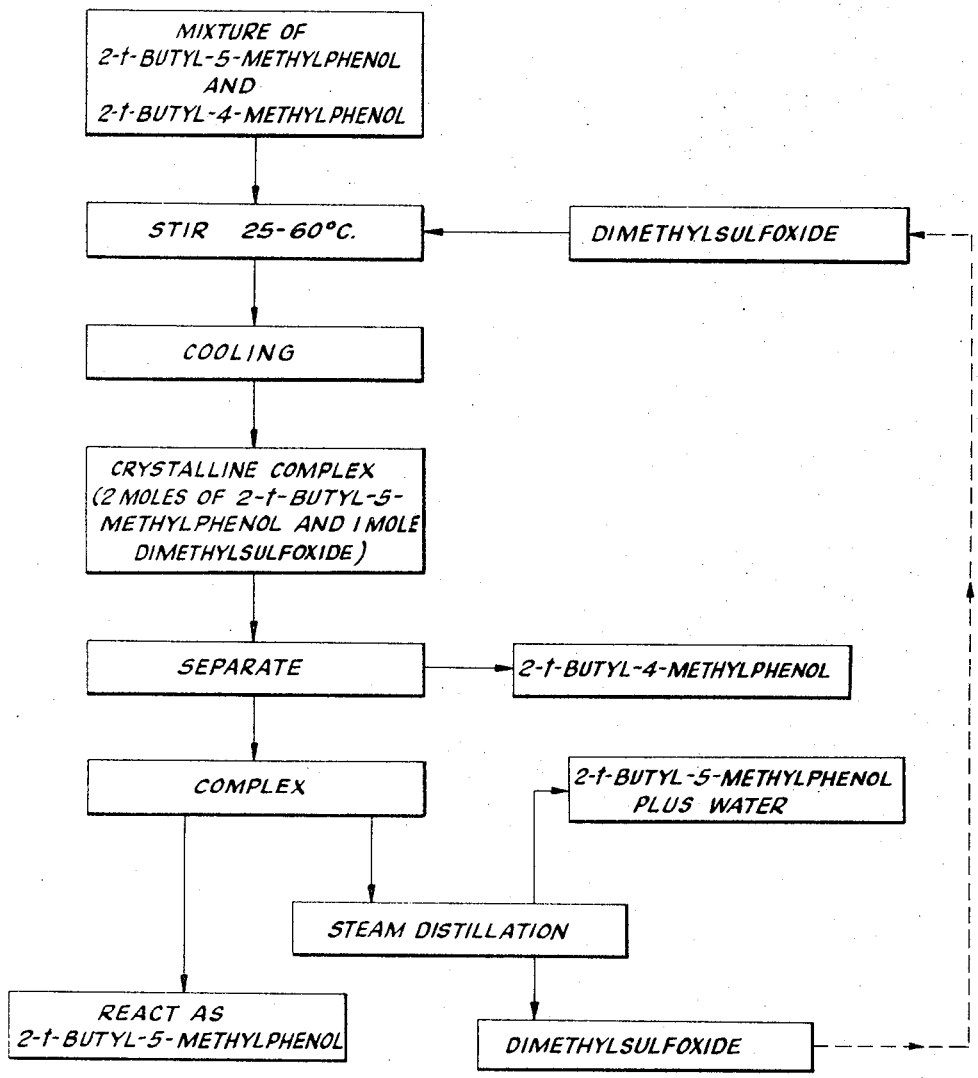
INVENTOR.
GERD LESTON United States Patent Office 3,452,104
Patented June 24, 1969

3,452,104
PROCESS FOR SEPARATION OF
MONO-BUTYLATED CRESOLS
Gerd Leston, Pittsburgh, Pa., assignor to Koppers Company, Inc., a corporation of Delaware
Filed Dec. 3, 1965, Ser. No. 511,551
Int. Cl. C07c 37/22
U.S. Cl. 260—607                                              3 Claims

ABSTRACT OF THE DISCLOSURE

A novel complex, formed from two moles of 2-t-butyl-5-methylphenol and one mole of dimethylsulfoxide, is described. The complex is useful in a process for the separation of 2-t-butyl-5-methylphenol from its isomer, 2-t-butyl-4-methylphenol.

This invention relates to the separation of 2-t-butyl-5-methylphenol from mixtures containing 2-t-butyl-5-methylphenol and 2-t-butyl-4-methylphenol and to a novel composition of matter, a complex comprising two moles of 2-t-butyl-5-methylphenol and one mole of dimethylsulfoxide.

The mixture of meta-, and para-cresol isomers that is obtained from coal tar usually analyzes about 60 percent meta- and 40 percent para-cresol. Due to the close boiling points of these isomers, 202.23° C. (meta) and 201.94° C. (para) at atmospheric pressure, the mixture is sold commercially instead of the separate isomers.

The butylation of the mixture of meta- and para-cresol with isobutylene under conditions favoring mono-t-butylation results in a mixture of monobutyl cresols with some dibutyl cresols and isobutylene polymers. The monobutylated cresols are separable by distillation from the remainder of the reaction mass. The separation of the monobutylated products (2-t-butyl-5-methylphenol, the predominant product from meta-cresol, and 2-t-butyl-4-methylphenol, the pre-dominant product from para-cresol) is not practical by commercial distillation.

A eutectic of the two mono-butylated cresols arises at about the 2:1 ratio (2-t-butyl-5-methylphenol to 2-t-butyl-4-methylphenol) which would be obtained from a commercial meta-, para-cresol mixture, precludes separation of these compounds by crystallization. Stevens et al., Patent No. 2,206,924 describe a process whereby the isomers can be separated by dibutylation of the cresol mixtures, then separation by distillation, and debutylation and subsequent separation by distillation.

According to the present invention, 2-t-butyl-5-methylphenol is readily separated from a mixture of 2-t-butyl-5-methylphenol and 2-t-butyl-4-methylphenol by the addition of dimethylsulfoxide to the mixture. A new composition, the solid complex of 2-t-butyl-5-methylphenol and dimethylsulfoxide in a 2:1 mole ratio is formed which, upon cooling of the mixture, precipitates as crystals and may be separated. The crystals can be decomposed by steam distillation to yield 2-t-butyl-5-methylphenol as overhead and dimethylsulfoxide as residue. The 2-t-butyl-5-methylphenol can then be debutylated to obtain pure meta-cresol.

The dimethylsulfoxide is added to a mixture containing 2-t-butyl-5-methylphenol and 2-t-butyl-4-methylphenol at a temperature preferably maintained at between 25° C. and 60° C. The higher temperature is near the melting point of the complex and the lower temperature near the freezing point of 2-t-butyl-5-methylphenol. The complex precipitates upon cooling as a white crystalline solid. The complex can be aided in precipitation by known means such as seeding of the mixture with a crystal of previously prepared complex, if desired. The presence of a hydrocarbon diluent does not affect the reaction between 2-t-butyl-5-methylphenol and dimethylsulfoxide to form a complex. Solvents which can be employed as diluents in the separation of 2-t-butyl-5-methylphenol from 2-t-butyl-4-methylphenol comprise the aliphatic and alicyclic hydrocarbons having up to eight carbon atoms. These solvents do not sufficiently dissolve the solid complex to interfere with separation by filtration or other means.

The crystals of 2-t-butyl-5-methylphenol-dimethylsulfoxide are readily recovered by filtering, decanting, or the like. The mother liquor that remains is enriched in 2-t-butyl-4-methylphenol. This mother liquor may then be used as a source of 2-t-butyl-4-methylphenol.

The 2-t-butyl-5-methylphenol-dimethylsulfoxide complex is a novel compound, and consists of two moles of 2-t-butyl-5-methylphenol and one mole of dimethylsulfoxide. It is a white crystalline solid having a melting point of 69–70° C.

The novel compound is useful in the production of 4,4'-butylidenebis(2-t-butyl-5-methylphenol) or other antioxidants, and as an agricultural chemical.

Suprisingly, dimethylsulfoxide does not form a solid complex with related phenols such as 2-t-butyl-4-methylphenol, 2-isopropyl-5-methylphenol (thymol), meta-isopropylphenol, para-isopropylphenol, 2,5-xylenol, 2,4-xylenol, meta-cresol or para-cresol under the conditions employed in the formation of the complex formed from two moles of 2-t-butyl-5-methylphenol and one mole of dimethylsulfoxide.

The process of this invention is schematically illustrated in the accompanying drawing by flow diagram.

The invention is illustrated further in the following examples.

EXAMPLE I

A mixture of 2-t-butyl-5-methylphenol and 2-t-butyl-4-methylphenol, corresponding to the product obtained by the butylation of commercially available 3° meta-, para-cresol fraction, was analyzed and the mixture found to be 63.4 percent 2-t-butyl-5-methylphenol; 35.2 percent 2-t-butyl-4-methylphenol; and 1.4 percent impurities such as isobutylene low molecular weight polymers, residual cresols, etc. To 50 grams of the above mixture (31.7 grams, 0.19 mole of 2-t-butyl-5-methylphenol and 17.6 grams, 0.11 mole of 2-t-butyl-4-methylphenol) was added 100 ml. of n-hexane at 25° C., with stirring. Then 7.6 grams (0.097 mole) of dimethylsulfoxide was added dropwise, with stirring, and the mixture was cooled to 0° C. in an ice bath. A white solid crystallized out of solution. The white solid was filtered from the liquid mixture and recrystallized from n-hexane. There was recovered 15.9 grams of a solid having a melting point of 69–70° C. Analysis of the solid was made by infrared spectrometric procedure in chloroform solution. Absorption bands at 8.81 and 9.27 microns were used to ascertain the mole percent of 2-t-butyl-5-methylphenol in the complex, employing extinction coefficients obtained from pure 2-t-butyl-5-methylphenol. "Free" 2-t-butyl-5-methylphenol has corresponding bands at 8.80 and 9.25 microns. The mole percent of dimethylsulfoxide in the complex was determined from measuring the S=O absorption band at 9.60 microns, employing an extinction coefficient obtained from pure dimethylsulfoxide. "Free" dimethylsulfoxide shows an S=O absorption band at 9.50 microns. The analysis established that the complex was not decomposed in chloroform and consisted of two moles of 2-t-butyl-5-methylphenol and one mole of dimethylsulfoxide. Gas chromatographic analysis of the solid complex was also made and showed 80.3 area percent 2-t-butyl-5-methylphenol and 19.7 area percent dimethylsulfoxide, corresponding to the theoretical weight percent of 80.4 percent 2-t-butyl-5-methylphenol and 19.6 percent dimethylsulfoxide for a complex consisting of two moles of 2-t-butyl-5-methylphenol and one mole of dimethylsulfoxide.

Differential thermal analysis of the above complex to determine its crystalline nature indicated a crystalline transition at approximately −34° C., a melting point of 70° C. and a boiling point of approximately 245° C. at 730 millimeter pressure. Neither dimethylsulfoxide nor 2-t-butyl-5-methylphenol gave a −34° C. transition. The analysis was run on a Du Pont–900 Differential Thermal Analyzer under the following conditions: 20° C. per minute heating rate, 1.0 liter per minute $N_2$ flow rate, using a macro sample tube and alumina reference material.

Analysis by X-ray diffraction also indicated that the complex was definitely crystalline in nature. The diffraction pattern obtained was different from any known compound. The major X-ray diffraction peaks and their relative intensities were as follows:

| d spacing (A.): | Relative intensity |
| --- | --- |
| 9.38 | 3 |
| 9.08 | 8 |
| 8.26 | 100 |
| 6.43 | 12 |
| 4.93 | 6 |
| 4.72 | 2 |
| 4.51 | 31 |
| 4.38 | 11 |
| 4.27 | 24 |
| 4.21 | 51 |
| 4.00 | 5 |
| 3.84 | 2 |

The conditions of the analysis were:

| Copper $K\alpha$ | Radiation | Nickel filter |
| --- | --- | --- |
| 35 kv. | 20 MA | |
| 1° 1° | .006″ Slits | |

| | |
| --- | --- |
| Scale factor | 64 |
| Time constant, seconds | 4 |
| Multiplier | 0.8 |
| Geiger counter voltage | 1800 |
| Chart speed, inch per minute | 1 |

Thus, the novel complex formed from two moles of 2-t-butyl-5-methylphenol and one mole of dimethylsulfoxide is crystalline in nature and may be readily identified by its crystalline characteristic.

EXAMPLE II

A mixture of 2-t-butyl-5-methylphenol (164.0 grams, 1.0 mole) and 2-t-butyl-4-methylphenol (81.0 grams, 0.5 mole) was prepared. To this mixture at room temperature was slowly added 40 grams (0.5 mole) of dimethylsulfoxide. The temperature of the mixture rose slightly on addition of the dimethylsulfoxide. The mixture was stirred and cooled in a cold water bath. A few crystals of previously prepared 2-t-butyl-5-methylphenol-dimethylsulfoxide complex were added to aid the crystallization. By the time the temperature of the mixture had cooled to 25° C., a slush had formed. The slush was centrifuged and 124.7 grams of white crystals, M.P. 60–65° C., were obtained. The solid was recrystallized from n-hexane and the melting point of the solid so obtained was 68.5–69.5° C. The solid was subjected to a second recrystallization from n-hexane, and the resulting solid had a melting point of 69–69.8° C. The recrystallized solid was analyzed by gas chromatography and found to be a complex of two moles of 2-t-butyl-5-methylphenol and one mole of dimethylsulfoxide.

EXAMPLE III

The solid complex consisting of two moles of 2-t-butyl-5-methylphenol and one mole of dimethylsulfoxide from Example I was distilled at various pressures. The boiling point of the complex at various pressures is compared with the boiling point of dimethylsulfoxide in the following table:

| Pressure (mm. Hg.) | Boiling point, ° C. | Boiling point of dimethylsulfoxide, ° C |
| --- | --- | --- |
| 10 | 122 | 72 |
| 20 | 135 | 87 |
| 50 | 156 | 108 |
| 100 | 173 | 126 |
| 150 | 183 | 137 |
| 730 | 240 | 192 |

The above data show that the complex is stable and not readily decomposed by fractional distillation.

EXAMPLE IV

The 2-t-butyl-5-methylphenol-dimethylsulfoxide complex was found to be decomposed by employing steam distillation. A 30 gram sample of complex (containing 24.2 grams of 2-t-butyl-5-methylphenol) was steam distilled. Three 200 ml. portions of steam distillate were collected and analyzed. Each portion of distillate comprised an aqueous phase and a solid on the surface. The three individual portions were filtered and the solid weighed and analyzed. The hold-up in the apparatus and the solid portion of the residue were also weighed and analyzed by vapor phase chromatography. The results follow:

| Sample | Wt. of solid | Percent 2-t-butyl-5-methylphenol [1] |
| --- | --- | --- |
| Portion 1 (200 ml.) | 4.6 | 100 |
| Portion 2 (200 ml.) | 6.7 | 99.9 |
| Portion 3 (200 ml.) | 7.1 | 99.6 |
| Hold-up | 4.1 | 99.6 |
| Residue | 2.7 | 81.6 |

[1] Remainder is dimethylsulfoxide.

The above data accounts for all of the 2-t-butyl-5-methylphenol in the 30 grams of starting material, with about 92 percent of the 2-t-butyl-5-methylphenol being carried over by the steam distillate (the liquid portion of the distillates showed no dimethylsulfoxide). The liquid residue in the steam-distillation pot contained the residual dimethylsulfoxide which formed part of the original solid complex. Thus, it is possible to decompose the solid complex of two moles of 2-t-butyl-5-methylphenol and one mole of dimethylsulfoxide by subjecting the complex to steam distillation whereby the 2-t-butyl-5-methylphenol is carried over by the steam distillate while the dimethylsulfoxide remains in the distillation pot.

EXAMPLE V

To a three-neck, 500 ml. flask equipped with a dropping funnel, mechanical stirrer, thermometer and reflux condenser was added 51.0 g. of the stable solid complex of 2-t-butyl-5-methylphenol and dimethylsulfoxide, 32 ml. of methanol and 10.5 grams of concentrated hydrochloric acid. To this mixture was added 9.9 grams (0.14 mole) of n-butyraldehyde, at a temperature of 35–40° C. with stirring during a period of 70 minutes. The resulting mixture was refluxed (79–77° C.) for three hours. The mixture was then transferred to a 600 ml. beaker, and 250 ml. water and 200 ml. n-hexane added. On cooling, a solid was filtered and washed with hexane. The solid was dried for two hours at 100° C. under vacuum until constant weight (35.3 grams) was achieved. The resulting solid was 4,4′-butylidene-bis(2-t-butyl-5-methylphenol) and corresponded to a 74 percent yield based on the amount of 2-t-butyl-5-methylphenol in the starting complex. The product melted at 206.5–210° C. The melting point of 4,4′-butylidene-bis(2-t-butyl-5-methylphenol) reported by D. J. Beaver et al., Journal of the Amer. Chem. Soc., 74, p. 3410 (1952) is 210–210.7° C.

I claim:
1. Process for separating 2-t-butyl-5-methylphenol from a mixture of 2-t-butyl-5-methylphenol and 2-t-butyl-4-methylphenol comprising:

adding dimethylsulfoxide to said mixture at a temperature of 25–60° C., cooling said mixture whereby a solid complex of two moles 2-t-butyl-5-methylphenol and one mole dimethylsulfoxide precipitates therefrom, separating said complex from said mixture, decomposing said complex by steam distillation to give 2-t-butyl-5-methylphenol and dimethylsulfoxide, and recovering substantially pure 2-t-butyl-5-methylphenol therefrom.

2. A process according to claim 1 wherein a hydrocarbon solvent selected from the group consisting of aliphatic and alicyclic hydrocarbons having up to eight carbon atoms is added to said mixture, to form a solution thereof, prior to the addition of dimethylsulfoxide.

3. The complex consisting of two moles of 2-t-butyl 5-methylphenol and one mole of dimethylsulfoxide further characterized as being a white crystal having a crystalline transition point at about −34° C., a melting point of 70° C. and a boiling point of about 245° C. at 730 mm pressure.

No references cited.

BERNARD HELFIN, Primary Examiner.

W. B. LONE, Assistant Examiner.

U.S. Cl. X.R.

260—624, 627